United States Patent
Guan et al.

(10) Patent No.: US 11,613,464 B2
(45) Date of Patent: Mar. 28, 2023

(54) MODIFIED BORON NITRIDE NANOTUBES AND SOLUTIONS THEREOF

(71) Applicant: NATIONAL RESEARCH COUNCIL OF CANADA, Ottawa (CA)

(72) Inventors: Jingwen Guan, Ottawa (CA); Benoit Simard, Ottawa (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 352 days.

(21) Appl. No.: 16/758,487

(22) PCT Filed: Oct. 4, 2018

(86) PCT No.: PCT/CA2018/051254
§ 371 (c)(1),
(2) Date: Apr. 23, 2020

(87) PCT Pub. No.: WO2019/079882
PCT Pub. Date: May 2, 2019

(65) Prior Publication Data
US 2020/0262703 A1 Aug. 20, 2020

Related U.S. Application Data

(60) Provisional application No. 62/578,003, filed on Oct. 27, 2017.

(51) Int. Cl.
*C01B 21/00* (2006.01)
*C01B 21/064* (2006.01)

(52) U.S. Cl.
CPC ...... *C01B 21/0648* (2013.01); *C01P 2002/85* (2013.01); *C01P 2002/88* (2013.01); *C01P 2004/03* (2013.01); *C01P 2004/133* (2013.01)

(58) Field of Classification Search
CPC ..... C01B 21/0648; C09D 7/61; C03C 17/007; C03C 25/1061; C03C 25/16; C08J 7/06
See application file for complete search history.

(56) References Cited

U.S. PATENT DOCUMENTS

| 8,703,023 | B2 | 4/2014 | Sainsbury et al. |
| 9,150,771 | B2 | 10/2015 | Mazyar et al. |
| 2015/0023858 | A1 | 1/2015 | Tour et al. |
| 2016/0133928 | A1 | 5/2016 | Nemeth |

FOREIGN PATENT DOCUMENTS

| JP | 2007145677 A | 6/2007 |
| JP | 2015187057 A | 10/2015 |
| WO | 2014169382 A1 | 10/2014 |
| WO | 2014199200 A1 | 12/2014 |

OTHER PUBLICATIONS

Blase, X. et al. (1994) Stability and Band Gap Constancy of Boron Nitride Nanotubes. Europhysics Letters. 28(5). pp. 335-340.
Chopra, N. G. et al. (1995) Boron Nitride Nanotubes. Science. 269. pp. 966-968.
Ciofani, G. et al. (2012) A Simple Approach to Covalent Functionalization of Boron Nitride Nanotubes. Journal of Colloid and Interface Science. 374. pp. 308-314.
Fathalizadeh, A. et al. (2014) Scaled Synthesis of Boron Nitride Nanotubes, Nanoribbons, and Nanococoons Using Direct Feedstock Injection into an Extended-Pressure, Inductively-Coupled Thermal Plasma. ACS Publications. NANO Letters. 14. pp. 4881-4886.
Gao, Z. et al. (2011) Noncovalent Functionalization of Disentangled Boron Nitride Nanotubes with Flavin Mononucleotides for Strong and Stable Visible-Light Emission in Aqueous Solution. ACS Applied Materials & Interfaces. ACS Publications. American Chemical Society. 3. pp. 627-632.
Gao, Z. et al. (2016) Book: Boron Nitride Nanotubes in Nanomedicine. Chapter 2—Functionalization of Boron Nitride Nanotubes for Applications in Nanobiomedicine. Section 2.2.2 Boron Site Reaction. pp. 22-23.
Golberg, D. et al. (2007) Boron Nitride Nanotubes. Wiley InterScience. Advanced Materials. 19. pp. 2413-2432.
Guan, J. et al. (2018) Epoxy Resin Nanocomposites with Hydroxyl (OH) and Amino (NH2) Functionalized Boron Nitride Nanotubes. Nanocomposites. 4(1). pp. 10-17.
Guan, J. et al. (2018) pH-Switchable Water-Soluble Boron Nitride Nanotubes. Materials Science Inc. Nanomaterials & Polymers. ChemPubSoc Europe. 3. pp. 9308-9312.
Han, W.-Q. et al. (2002) Transformation of BxCyNz Nanotubes to Pure BN Nanotubes. Applied Physics Letters. 81(6). pp. 1110-1112.
Iijima, S. (1991) Helical Microtubules of Graphitic Carbon. Letters to Nature. Nature Publishing Group. 354. pp. 56-58.
Iijima, S. et al. (1993) Single-Shell Carbon Nanotubes of 1-nm Diameter. Nature Publishing Group. 363. pp. 603-605.
Ikuno, T. et al. (2007) Amine-Functionalized Boron Nitride Nanotubes. ScienceDirect. Elsevier. Solid State Communications. 142. pp. 643-646.
Kalay, S. et al. (2015) Synthesis of Boron Nitride Nanotubes and their Applications. Beilstein Journal of Nanotechnology. 6. pp. 84-102.
Kim, K. S. et al. (2014) Hydrogen-Catalyzed, Pilot-Scale Production of Small-Diameter Boron Nitride Nanotubes and Their Macroscopic Assemblies. ACS Nano. 8(6). pp. 6211-6220.
Kim, D. et al. (2015) Sonication-Assisted Alcoholysis of Boron Nitride Nanotubes for their Sidewalls Chemical Peeling. ChemComm. Royal Society of Chemistry. 51. pp. 7104-7107.

(Continued)

*Primary Examiner* — Steven J Bos
(74) *Attorney, Agent, or Firm* — Brunet & Co., Ltd.; Hans Koenig; Robert Brunet

(57) ABSTRACT

A modified boron nitride nanotube (BNNT) comprising pendant hydroxyl (OH) and amino ($NH_2$) functional groups covalently bonded to a surface of the BNNT. Aqueous and organic solutions of these modified BNNTs are disclosed, along with methods of producing the same. The modified BNNTs and their solutions can be used to coat substrates and to make nanocomposites.

22 Claims, 11 Drawing Sheets

(56) References Cited

OTHER PUBLICATIONS

Lau, Y.-T. R. et al. (2013) Facile and Mild Strategy Toward Biopolymer-Coated Boron Nitride Nanotubes via a Glycine-Assisted Interfacial Process. The Journal of Physical Chemistry C. ACS Publications. 117. pp. 19568-19576.

Lee, C. H. et al. (2012) Functionalization, Dispersion, and Cutting of Boron Nitride Nanotubes in Water. The Journal of Physical Chemistry C. ACS Publications. 116. pp. 1798-1804.

Lee, C. H. et al. (2016) Boron Nitride Nanotubes: Recent Advances in Their Synthesis, Functionalization, and Applications. Molecules. MDPI. 21. 922. doi:10.3390/molecules21070922. 19 pages.

Liao, Y. et al. (2014) Chemical Sharpening, Shortening, and Unzipping of Boron Nitride Nanotubes. Advanced Functional Materials. 24. pp. 4497-4506.

Liu, Y.-T. et al. (2013) Tuning the Solubility of Boron Nitride Nanosheets in Organic Solvents by Using Block Copolymer as a "Janus" Modifier. ChemComm. RSC Publishing. 49. pp. 388-390.

Martinez-Rubi, Y. et al. (2015) Self-Assembly and Visualization of Poly(3-hexyl-thiophene) Chain Alignment along Boron Nitride Nanotubes. The Journal of Physical Chemistry C. ACS Publications. 119. pp. 26605-26610.

Peyghan, A. A. et al. (2013) Theoretical Study on Surface Modification of BN Nanotubes with 1,2-diaminobenzenes. Acta Chim. Slov. 60. pp. 743-749.

Rimola, A. et al. (2014) Gas-Phase and Microsolvated Glycine Interacting with Boron Nitride Nanotubes. A B3LYP-D2* Periodic Study. Inorganics. 2. doi:10.3390/inorganics2020334. pp. 334-350.

Rubio, A. et al. (1994) Theory of Graphitic Boron Nitride Nanotubes. Physical Review B. Rapid Communications. 49(7). pp. 5081-5084.

Sainsbury, T. et al. (2007) Self-Assembly of Gold Nanoparticles at the Surface of Amine- and Thiol-Functionalized Boron Nitride Nanotubes. J. Phys. Chem. C. 111. pp. 12992-12999.

Sainsbury, T. et al. (2012) Covalently Functionalized Hexagonal Boron Nitride Nanosheets by Nitrene Addition. Chemistry a European Journal. ChemPubSoc Europe. 18. pp. 10808-10812.

Sainsbury, T. et al. (2012) Oxygen Radical Functionalization of Boron Nitride Nanosheets. ACS Publications. American Chemical Society. 134. pp. 18758-18771.

Shin, H. et al. (2015) Covalent Functionalization of Boron Nitride Nanotubes via Reduction Chemistry. ACS Nano. 9(12). pp. 12573-12582.

Smith, M. W. et al. (2009) Very Long Single- and Few-Walled Boron Nitride Nanotubes via the Pressurized Vapor/Condenser Method. Nanotechnology. IOP Publishing. 20. 505604. 7 pages.

Tiano, A. L. et al. (2013) Thermodynamic Approach to Boron Nitride Nanotube Solubility and Dispersion. Nanoscale. Royal Society of Chemistry. 13 pages.

Weng, Q. et al. (2016) Functionalized Hexagonal Boron Nitride Nanomaterials: Emerging Properties and Applications. Chem Soc Rev. Royal Society of Chemistry. 45. pp. 3989-4012.

Xie, S.-Y. et al. (2005) Solubilization of Boron Nitride Nanotubes. Communication. ChemComm. The Royal Society of Chemistry. pp. 3670-3672.

Yang, Z.-Y. et al. (2009) Functionalization of BN Nanotubes with Free Radicals: Electroaffinity-Independent Configuration and Band Structure Engineering. Frontiers of Physics in China. Research Article. 4(3). pp. 378-382.

Yu, J. et al. (2009) Dispersion of Boron Nitride Nanotubes in Aqueous Solution with the Help of Ionic Surfactants. Solid State Communications. Elsevier. 149. pp. 763-766.

Zhi, C. et al. (2005) Covalent Functionalization: Towards Soluble Multiwalled Boron Nitride Nanotubes. Nanotubes. Wiley InterScience. Angew. Chem. 117. pp. 8146-8149.

Zhi, C. et al. (2006) Purification of Boron Nitride Nanotubes through Polymer Wrapping. Articles. J. Phys. Chem. B. 110. pp. 1525-1528.

Zhi, C. et al. (2007) Grafting Boron Nitride Nanotubes: From Polymers to Amorphous and Graphitic Carbon. J. Phys. Chem. C. 111. pp. 1230-1233.

Zhi, C. Y. et al. (2009) Chemically Activated Boron Nitride Nanotubes. Wiley InterScience. Chem. Asian J. 4. pp. 1536-1540.

Zhou, S.-J. et al. (2012) Activation of Boron Nitride Nanotubes and their Polymer Composites for Improving Mechanical Performance. Nanotechnology. IOP Publishing. 23. 055708. 9 pages.

English Machine Translation of JP 2007145677 A.

English Machine Translation of JP 2015187057 A.

International Search Report dated Jan. 15, 2019.

Partial Supplementary European Search Report dated May 11, 2021.

Extended European Search Report dated Jun. 23, 2021.

Kalay, S. et al. (2016) Water-Dispersed Thermo-Responsive Boron Nitride Nanotubes: Synthesis and Properties. Nanotechnology. IOP Publishing. 27. 035703. 8 pages.

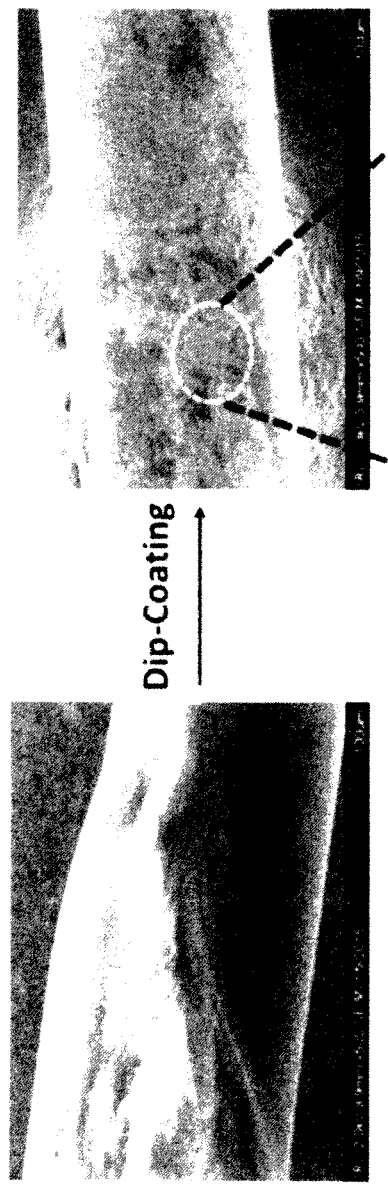
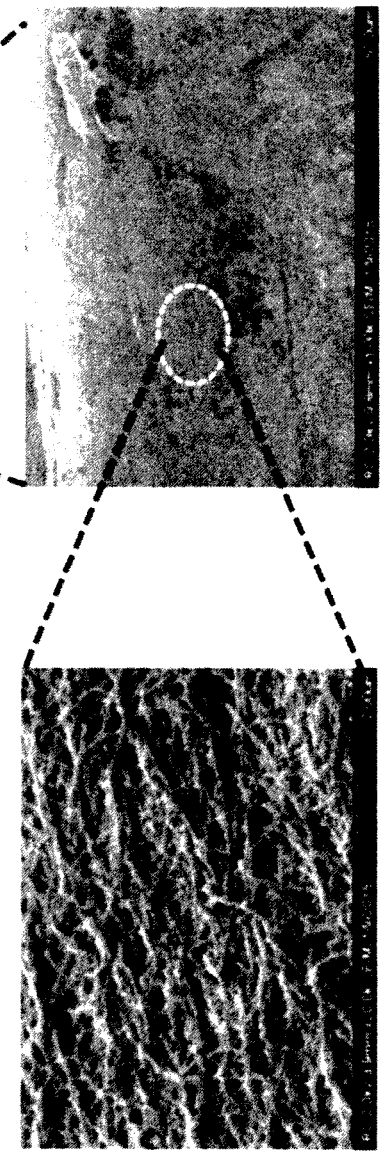
FIGURE 10A
FIGURE 10B
FIGURE 10C
FIGURE 10D

MODIFIED BORON NITRIDE NANOTUBES AND SOLUTIONS THEREOF

CROSS-REFERENCE TO RELATED APPLICATIONS

This application is a national phase entry of International Patent Application PCT/CA2018/051254 filed Oct. 4, 2018, which claims the benefit of U.S. Provisional Patent Application Ser. No. 62/578,003 filed Oct. 27, 2017.

TECHNICAL FIELD

The present disclosure relates to boron nitride nanotubes. More specifically, it relates to modified boron nitride nanotubes, including their method of production and use.

BACKGROUND

Boron Nitride Nanotubes (BNNTs) are similar to carbon nanotubes (CNTs), which are hollow cylinders with small diameters (for example, less than 100 nm) and with lengths over a micrometer. However, instead of carbon atoms, BNNTs comprise alternating nitrogen and boron atoms. BNNTs can be constructed as single-walled, double-walled, few-walled or multi-walled nanotubes.

BNNTs have a few physical properties that are similar to those of CNTs, such as low density and high mechanical strength. However, there are also a few key differences.

For example, whereas CNTs can be metallic or semiconducting (depending on the rolling direction and radius), a BNNT is an electrical insulator with a bandgap of ~5.5 eV, independent of tube chirality or morphology. In addition, a layered boron nitride structure is much more thermally stable than a graphitic carbon structure. Furthermore, BNNTs have high thermal conductivity, high piezoelectricity, excellent neutron-radiation shielding ability, unique optical-optoelectronic properties, and transparency to visible light. Due to these advantageous properties, there can be many novel applications of BNNTs.

In spite of such promise, BNNTs face the same challenges as CNTs with regards to removal of impurities from raw tubes. In addition, once the raw tubes are purified, they bundle together (due to van der Waals forces), thereby becoming inert and insoluble.

In order to render bundles of BNNTs useful, soluble and compatible with a matrix, the BNNTs can be debundled by either: i) "coating" a portion or the entire surface of each BNNT with a surfactant; or ii) chemical surface modification using anchoring functional groups.

Recent attempts to modify BNNTs, in order to make them soluble, have employed cationic, anionic and polymeric surfactants.

For example, PEG-1500N (a polyethylene glycol diamine) has been used, through coordination bond interaction, on surface boron sites to bring BNNTs into aqueous solution (Sun et al. *Chem Commun.*, 2005, 3670-3672).

In addition, polymer wrapping has been used to obtain pure BNNTs in a chloroform solution (Golberg et al., *J. Phys. Chem. B*, (2006), 110(4), pp. 1525-1528). The polymer used was the conjugated polymer poly(m-phenylenevinylene-co-2,5-dioctoxy-p-phenylenevinylene) (PmPV).

Furthermore, a small cationic surfactant, such as ammonium oleate, has been used to bring BNNTs into solution (Yu et al. *Solid States Comm.*, 2009, 149, 763-766).

A BNNT aqueous solution has been formed by using flavin mononucleotides (FMN) through n-n stacking (Golberg et al., *ACS Appl. Mater Interfaces*, (2011), 3, pp. 637-632).

Yap et al. have solubilized BNNTs in water by adsorbing long alkyl chains onto the surface of BNNTs (Yap et al., *J. Phys. Chem. C*, 2012, 116, 1798-1804).

Biopolymers have been used to coat BNNTs via a glycine-assisted interfacial process to bring BNNTs into aqueous solution (Golberg et al. *J. Phys. Chem. C*, (2013), 117, pp. 19568-19576).

Finally, Y. Martinez et al. (Y. Martinez-Rube et al., *J. Phys. Chem. C*, 2015, 119, 26605-26610) have reported a purple solution of BNNTs with poly(3-hexylthiophene-2,5-diyl) (P3HT), formed by co-sonication of a suspension of BNNTs in chloroform with a P3HT-chloroform solution through n-n stacking.

From the above, it appears that several water-soluble surfactants are able to bring BNNTs into solution without any covalent modification of the BNNTs.

There are also studies that investigate the possibility of solubilizing BNNTs using covalent functionalization through chemical linkage and bond formation directly to the BNNT network. While covalent functionalization of BNNTs has been reported, in many cases the covalently modified BNNTs are not soluble, or poorly soluble in a variety of solvents.

For example, Zhi et al. (*Angew. Chem.* 2005, 117, 8146-8149) report the reaction of surface amino groups that hang at the end of a BNNT, or at a cavity site, with carboxylate chloride (stearoyl chloride) to form BNNTs that are functionalized with ester linkages to long alkyl chains.

Polymers have been grafted onto BNNT through atom-transfer radical-polymerization (ATRP), assuming the BNNT has dangling amino groups. For example, see boron oxide chemical vapor deposition (BOCVD) fabricated BNNTs, disclosed by Golberg et al. (*J. Phys. Chem. C* (2007), 111 (3), pp. 1230-1233).

Another example is provided by Zettl et al. (2007) (Zettl et al. *Solid State Communication*, (2007), 142, pp. 643-646), who describe an enriched amino surface group through ammonia plasma treatment of BNNTs. Plasma-treated BNNTs have been further functionalized with 3-bromopropanoyl chloride (BPC) via sonication of the amine functionalized-BNNTs to form BPC-BNNTs.

Ammonia-plasma treated BNNTs with enriched amino surface groups have had attached thereon short-chain thiol-terminated organic molecules, resulting in thiol-functionalized BNNTs (Zettl et al. *J Phys. Chem. C*, (2007), 111, pp. 12992-12999). Subsequently, gold particles were self-assembled on the surface.

BNNTs have been functionalized with hydroxyl groups by reaction of BNNTs with hydrogen peroxide in an autoclave at high temperature and high pressure (Zhi, et al., *Chemistry-An Asian Journal*, (2009), 4, pp. 1536). The OH-functionalized BNNTs were able to form a stable aqueous solution/suspension.

Zhou et al (Zhou et al., *Nanotechnology*, (2012), 23 pp. 055708) have reported that BNNTs can be activated at the hanging amine group with isophorone diisocyanate (IPDI) and then further functionalized.

Another approach to covalent functionalization of BNNTs uses 3-aminopropyltriethoxysilane (APTES) hydrolysis on an OH-functionalized BNNT surface, wherein the OH-functionalized BNNTs were obtained by concentrated HNO$_3$ treatment through three B—N bonds cleavage (Gianni et al. *J. Colloid Interface Sci*., (2012), 374, pp. 308-314).

Amine-functionalized BNNTs in aqueous solution have been produced by treatment of BNNTs in 10 wt % ammonia solution due to etching and zipping-out (see Park et al., *Adv. Funct. Mater*, (2014), 24, pp. 4497-4506).

In 2015, Shin and Guan et al. (*ACS Nano* (2015), 9(12), pp. 12573-12582) reported the alkyl functionalization of BNNTs by reduction chemistry. However, they did not report on the solubility of the modified BNNTs.

BNNTs have been functionalized with alkoxide groups through sonication in alcohol accompanied by the release of ammonia (Golberg et al. *Chem. Commun*. (2015), pp. 7104-7107). These functionalized BNNTs are soluble in alcohols and are also unzipped.

US Pat. Pub. No. US2016/0133928 A1 discloses the use of functionalized boron nitride (BN) particles as electroactive materials for an electrochemical energy storage device. The functional group is attached on the B and/or N site. The functionalized BN particles include covalently functionalized forms of at least one of hexagonal boron nitride, BNNTs, c-BN and amorphous BN. The covalently functionalized BN particles comprise a surface including a carbon coating, a polymer coating, or a coating comprising porous hard materials including $Si_3N_3$ and $SiS_2$. The covalent functional groups comprise: a) alkyl groups; b) phenyl and substituted phenyl groups; c) alkoxy groups; d) amino and N-functionalized amino groups; e) hydroxyl, oxo, peroxo, sulfo, disulfo, nitrozo, carbonyl, cyano, isocyano, cyanato, fulminato, isocyanato, thiocyanato, etc. groups; f) ethynyl, diethylnyl, carbodiimido, borodimido, hydro, nitrido groups; g) halogeno groups; and h) Lewis bases and Lewis acids, including $BH_3$.

Currently, there is no effective way to utilize the advantageous properties of BNNTs (e.g. transparency, material strength, thermal stability, insularity, etc.) in real applications due to the bundling of BNNTs. All reports of covalently functionalized BNNTs thus far have not yet proved fruitful in dissolving the nanotubes in solution, especially in aqueous solution, unless surfactants/surface agents are used. However, the large amount of surfactant added onto the surface of BNNTs, along with excess free surfactant in solution, undoubtedly interferes with the performance of BNNTs, either as a nano-filler for a composite, or as a coating agent on a substrate.

SUMMARY

In one aspect, there is provided a modified boron nitride nanotube (BNNT) comprising pendant hydroxyl (OH) and amino (NH$_2$) functional groups covalently bonded to a surface of the BNNT. The modified BNNT can be single-walled, double-walled, few-walled, or multi-walled. In the modified BNNT, a ratio of the pendant OH groups to NH$_2$ groups may be about 2:1; while the number of pendant OH groups may be between about 1 OH per 6 BN-units and about 1 OH per 240 BN-units; or between about 1 OH per 12 BN-units and about 1 OH per 124 BN-units; or the number of pendant OH groups may be about 1 OH per 18 BN-units.

In another aspect, there is provided a method for producing modified boron nitride nanotubes (BNNTs) comprising pendant hydroxyl (OH) and amino (NH$_2$) functional groups covalently bonded to a surface of the BNNTs, the method comprising treating BNNTs with a halogen in an aqueous solution. The treatment can be carried out at a temperature of between about 20° C. and about 50° C.; the treatment may be carried out for a period of about 4 hours to about 48 hours. Furthermore, the halogen may be chlorine, bromine or iodine.

In another aspect, there is provided an aqueous solution of modified boron nitride nanotubes (BNNTs) comprising pendant hydroxyl (OH) and amino (NH$_2$) functional groups covalently bonded to a surface of the BNNTs, wherein the aqueous solution has a pH of between about 4 and about 8. Furthermore, the aqueous solution of claim may have a pH of between about 5 and about 7. The solubility of the modified BNNTs can be about 1 mg/mL of solution or less; or it may be about 0.3 mg/mL of solution or less.

In another aspect, there is provided an organic solution of modified boron nitride nanotubes (BNNTs) comprising: a polar organic solvent and the modified BNNTs; wherein each modified BNNT comprises pendant hydroxyl (OH) and amino (NH$_2$) functional groups covalently bonded to a surface of the BNNT. The polar organic solvent may be an alkyl alcohol, for example, 2-propanol or methanol. Alternatively, the polar organic solvent may be acetonitrile, dimethylformamide (DMF), acetone or tetrahydrofuran (THF).

In the aforementioned solutions, a ratio of pendant OH groups to NH$_2$ groups may be about 2:1, while the number of pendant OH groups may be between about 1 OH per 6 BN-units and about 1 OH per 240 BN-units; or between about 1 OH per 12 BN-units and about 1 OH per 124 BN-units; or the number of pendant OH groups may be about 1 OH per 18 BN-units.

In another aspect, there is provided a method for producing an aqueous solution of modified boron nitride nanotubes (BNNTs), the aqueous solution having a pH of from about 4 to about 8, wherein: each modified BNNT comprises pendant hydroxyl (OH) and amino (NH$_2$) functional groups covalently bonded to a surface of the BNNT; and the method comprises treating BNNTs with a halogen in an aqueous medium. The method may further comprise a step of adjusting the pH of the aqueous medium to between about 5 and about 7. The treatment may be carried out at a temperature of between 20° C. and 50° C. In addition, the treatment can be carried out for a period of about 4 hours to about 48 hours. In the treatment, the halogen may be chlorine, bromine or iodine.

In another aspect, there is provided a method for producing an organic solution of modified boron nitride nanotubes (BNNTs), wherein: each modified BNNT comprises pendant hydroxyl (OH) and amino (NH$_2$) functional groups covalently bonded to a surface of the BNNT; and the method comprises: (a) treating BNNTs with a halogen in an aqueous medium to provide an aqueous solution of the modified BNNTs; (b) adjusting a pH of the aqueous solution outside a range of 4 to 8 to precipitate at least a portion of the modified BNNTs; (c) collecting the precipitate from step (b) comprising modified BNNTs; and (d) adding a polar organic solvent to the modified BNNTs to solubilize at least a portion of the modified BNNTs in the polar organic solvent. The treatment may be carried out at a temperature of between 20° C. and 50° C. In addition, the treatment can be carried out for a period of about 4 hours to about 48 hours. In the treatment, the halogen may be chlorine, bromine or iodine.

In another aspect there is provided a method for producing an organic solution of modified boron nitride nanotubes (BNNTs), wherein: each modified BNNT comprises pendant hydroxyl (OH) and amino (NH$_2$) functional groups covalently bonded to a surface of the BNNT; and the method comprises adding a polar organic solvent to the modified BNNTs to solubilize at least a portion of the modified BNNTs in the polar organic solvent.

In the aforementioned three methods of producing solutions, a ratio of pendant OH groups to $NH_2$ groups can be about 2:1, while the number of pendant OH groups may be between about 1 OH per 6 BN-units and about 1 OH per 240 BN-units; or between about 1 OH per 12 BN-units and about 1 OH per 124 BN-units; or the number of pendant OH groups may be about 1 OH per 18 BN-units. The polar organic solvent used in the two methods may be an alkyl alcohol, for example, 2-propanol or methanol. The polar organic solvent may also be acetonitrile, dimethylformamide (DMF), acetone or tetrahydrofuran (THF).

In another aspect, there is provided a use of the aqueous solution of modified BNNTs as a surface coating on a substrate. The substrate may be a hydrophilic substrate. The substrate may be an optical glass fibre, a polyacrylate, a silicon wafer, a glass, a PC film, a PET film, or a polyimide film.

In another aspect, there is provided a use of the organic solution of modified BNNTs as a surface coating on a substrate. The substrate may be a hydrophobic substrate. The substrate may be an optical glass fibre, a polyacrylate, a glass or a silicon wafer.

In another aspect, there is provided a method of coating a surface of a substrate with modified boron nitride nanotubes (BNNTs), wherein the method comprises: contacting the surface of the substrate with the aqueous solution of modified BNNTs; and evaporating the solvent of the aqueous solution from the surface of the substrate. The substrate may be a hydrophilic substrate. The substrate may be an optical glass fibre, a polyacrylate, a silicon wafer, a glass a PC film, a PET film or a polyimide film.

In another aspect, there is provided a method of coating a surface of a substrate with modified boron nitride nanotubes (BNNTs), wherein the method comprises: contacting the surface of the substrate with the organic solution; and evaporating the polar organic solvent of the organic solution from the surface of the substrate. The substrate may be a hydrophobic substrate. The substrate may be an optical glass fibre, a polyacrylate, a glass or a silicon wafer.

In both of the aforementioned methods of coating a surface of a substrate, the solution contacts the substrate by soaking, dip-coating, drop-casting, spray-coating or printing.

In another aspect, there is provided a nanocomposite comprising: modified boron nitride nanotubes; and one or more of a polymer, a ceramic, a metal, an epoxy resin polymer, and an epoxy resin monomer; wherein the modified BNNTs comprise pendant hydroxyl (OH) and amino ($NH_2$) functional groups covalently bonded to a surface of the BNNTs. The modified BNNTs may be single-walled, double-walled, few-walled or multi-walled. In the nanocomposite, a ratio of pendant OH groups to $NH_2$ groups may be about 2:1; while the number of pendant OH groups may be between about 1 OH per 6 BN-units and about 1 OH per 240 BN-units; or between about 1 OH per 12 BN-units and about 1 OH per 124 BN-units; or the number of pendant OH groups may be about 1 OH per 18 BN-units.

BRIEF DESCRIPTION OF FIGURES

The present application will now be described in greater detail with reference to the drawings in which:

FIGS. 10A-10D are SEM images of the surface morphology of a bared optical glass fiber surface before and after BNNT solution dip coating.

DETAILED DESCRIPTION

Figure 1:
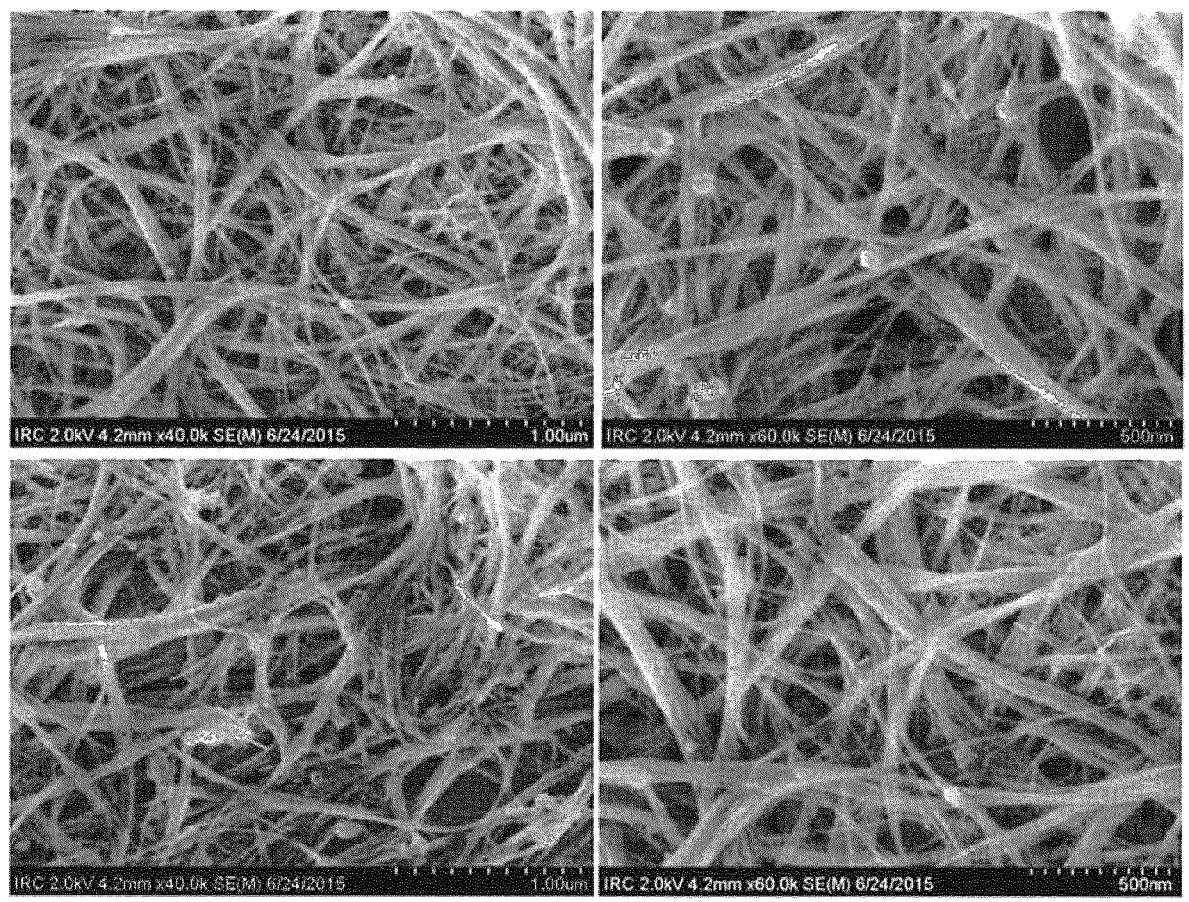
FIG. 1 shows SEM images at various magnifications of highly purified modified BNNTs.

While the making and using of various embodiments of modified BNNTs and solutions thereof are discussed in detail below, it should be appreciated that the modified BNNTs and solutions thereof, disclosed herein, provide many applicable inventive concepts that can be embodied in a wide variety of specific contexts. The specific embodiments discussed herein are merely illustrative of specific ways to make and use the modified BNNTs and solutions thereof, and do not delimit the scope of the modified BNNTs and solutions thereof.

To facilitate the understanding of the modified BNNTs and solutions thereof, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the modified BNNTs and solutions thereof, but their usage does not delimit the modified BNNTs and solutions thereof, except as outlined in the claims.

Preparation and Characterization of Modified BNNTs and Solutions Thereof

Summary of Materials and Methods

The materials used to produce modified BNNTs include liquid bromine (purchased from Sigma-Aldrich, CAS number: 7726-95-6) and raw BNNTs that are produced from a radio frequency (RF)-thermal induction plasma process using hexagonal boron nitride (h-BN) as one of the feedstocks. The preparation of raw BNNTs is based on the protocol disclosed in WO2014/169382 A1 and Kim et al. (*ACS Nano*, (2014), 8(6), pp. 6211-6220).

The raw BNNT material was first purified using a multistage purification process, as described below, to produce purified BNNTs. Subsequently, modified BNNTs were obtained through bromination and hydrolyzation of the purified BNNTs in situ by exposing the purified BNNTs to liquid bromine with bath sonication for 30 min at a time, during which the bromine first removed the remaining elementary boron particles and aggregates (produced during the synthesis of raw BNNTs and enriched during the purification process).

Subsequently, the excess bromine reacted with BNNTs by cleavage of B—N bonds. The resulting aqueous suspension of modified BNNTs was acidic due to the release of HBr into the aqueous solution. The modified BNNTs remained as a suspension and were unable to dissolve in the acidic aqueous solution.

The modified BNNTs were subsequently isolated from the acidic aqueous solution and washed with distilled water. The pH of the filtrate was monitored with pH paper and/or a pH meter. Once the pH of the filtrate was 4 or above, the wet modified BNNT paste was put into distilled water, or alternatively into a polar organic solvent.

A saturated solution of modified BNNTs (whether in an aqueous or organic solvent) was obtained by gentle bath-ultrasonication. The actual concentration of the solution depends on the degree of functionalization, the density of defects and the length of the nanotubes. Both the resulting aqueous and organic solutions were stable, translucent (i.e. with a slight white color), due to light scattering of the longitudinal size of the BNNTs and their bundles.

Both the organic and aqueous solutions can be selectively used for coating applications on hydrophilic and/or hydrophobic substrates.

A dry modified BNNT sample was obtained by filtering either the aqueous or organic solution of modified BNNTs through a membrane. In the case of an aqueous solution, for example, a polycarbonate membrane can be used. In the case of an organic solution, for example, a polytetrafluoroethylene (PTFE) membrane may be used. After filtration, the residue is dried.

Alternatively, a dry modified BNNT sample can be directly obtained by vacuum filtration from the wet paste after the removal of the bromine-containing solution and the washing with distilled water to the point where the filtrate attains a pH of 4 or above.

The dried sample was characterized by TGA-MS-FTIR, which confirms that the modified BNNTs contain hydroxyl and amino functional groups due to the release of water and ammonia. The dried modified BNNTs sample can be re-extracted into an aqueous solution or into an organic solution with the assistance of ultrasonication. Both the organic and aqueous solutions of modified BNNTs can be used to provide modified BNNT thin films coated onto substrates, using methods such as dip-coating, solution spray coating, drop casting and printing.

Purification Process—Stage 1

Raw BNNT materials contain numerous types of impurities, including left-over feedstock material (e.g. h-BN particles, processed h-BN, newly generated amorphous h-BN, organic BN-clusters, BN-polymers) and different types of elemental boron aggregates.

In the first stage of the BNNT purification process, some of the impurities were removed from the raw material through a combination of skimming, water extraction and filtration with the aid of mechanical stirring.

The raw material was suspended in distilled water and stirred mechanically, leading to a portion of the impurities floating to the surface of the suspension. While the suspension was stirred, these impurities were physically removed (for example, by using a spatula or an automatic brush-like system that sweeps on top of the surface of the suspension, or kitchen strainer like metal mesh). Meanwhile, hydrophilic impurities (e.g. particles and powders) remained suspended in the aqueous phase and were easily filtered out through a metal mesh (for example, with a mesh open size of about 30-51 µm, the size of the metal mesh may be selected depending on the quantity of the sample processed). After many cycles of removing surface impurities and filtration of hydrophilic impurities with the assistance of mechanical stirring, there remained fibrous BNNT material free from macroscopic impurities, along with a clear aqueous phase. The number of cycles required to attain this stage depended on the amount of starting raw BNNT material and the volume of water used to suspend the raw material.

Purification Process—Stage 2

The remaining impurities are either encapsulated in the fibrous BNNT blocks, bundles and knots; or physically attached to the fibrous structures. Bath-ultrasonication was applied to physically loosen these remaining impurities and separate them from the fibrous BNNT material.

For example, a suspension of fibrous BNNT material was bath-ultrasonicated in a 4 L beaker using a Branson 5510 Bath-sonicator (power output: 135 W, 42 KHz) under continuous mechanical stirring for a 30 min cycle. The suspension was allowed to settle for 2 to 4 hours, after which the top layer (enriched with impurities) was decanted and the remaining bottom portion (enriched with BNNTs) was filtered through a metal mesh. The wet paste was put back in a 4 L beaker which was refilled with fresh distilled water. The suspension was repeatedly treated in the same way for a number of cycles in order to achieve a certain level of purity that can serve as a basis for different applications and purity requirements. The number of cycles depends on the quantity of BNNT material in the 4 L beaker and the desired level of purity. For a large quantity of BNNT material, multiple beakers or large vessels with floating process can be engineered for scale-up and cost-efficiency.

During this stage of purification, after the first few cycles, part of the physically independent elemental boron particles and aggregates in the mixture started to float to the top of the suspension, thereby forming a black shiny layer that was easily removed from the suspension (for example, using a spatula or a metal mesh strainer), This removal was repeated until there was no more black layer. Meanwhile, as the suspension settled in the beaker, some remaining macroscopic particle-like impurities tended to settle out from the suspension and were further removed by carefully pouring the bottom fibrous suspension layer out of the beaker, while keeping the heavy sand-like large particle impurities at the bottom of beaker.

After many cycles of washing the suspension in the aforementioned manner, the liquid phase of the suspension became visually clear (relative to the starting point of stage 2) after bath-sonication and settling for a few minutes. After the final wash, (determined based on the purity level requirement estimated by SEM analysis), the purified suspension was filtered through a polycarbonate membrane (PC, pore size: >20 µm) to obtain a loose dry sample of pre-purified BNNTs (herein termed "the first degree" of purified BNNTs). It should be noted that although a portion of the elemental boron particles was removed by skimming from the top surface of the suspension during this stage, there were still significant amounts of elemental boron impurities remaining (usually about 20-40% by weight). Therefore, the sample of first degree of purified BNNTs was still very dark in color and further removal of elemental boron content was required.

Conversion to Modified BNNTs: Treatment with Liquid Bromine

The first degree of purified BNNTs described above (either in an aqueous suspension or in dry form) was further processed in an aqueous suspension with the addition of excess liquid bromine ($Br_2(l)$), along with magnetic stirring and gentle bath-sonication until the dark BNNT material became white. According to SEM images (as shown in FIG. 1), the purity of the purified BNNTs is estimated to be over 95 wt %.

In this process, liquid bromine reacted first with remaining elemental boron particles in the suspension. Once the boron particles were completely consumed by the liquid bromine, the excess $Br_2$ reacted with BNNTs by cleavage of B—N bonds on the surface of the nanotubes through bromination and hydrolyzation.

Figure 2:
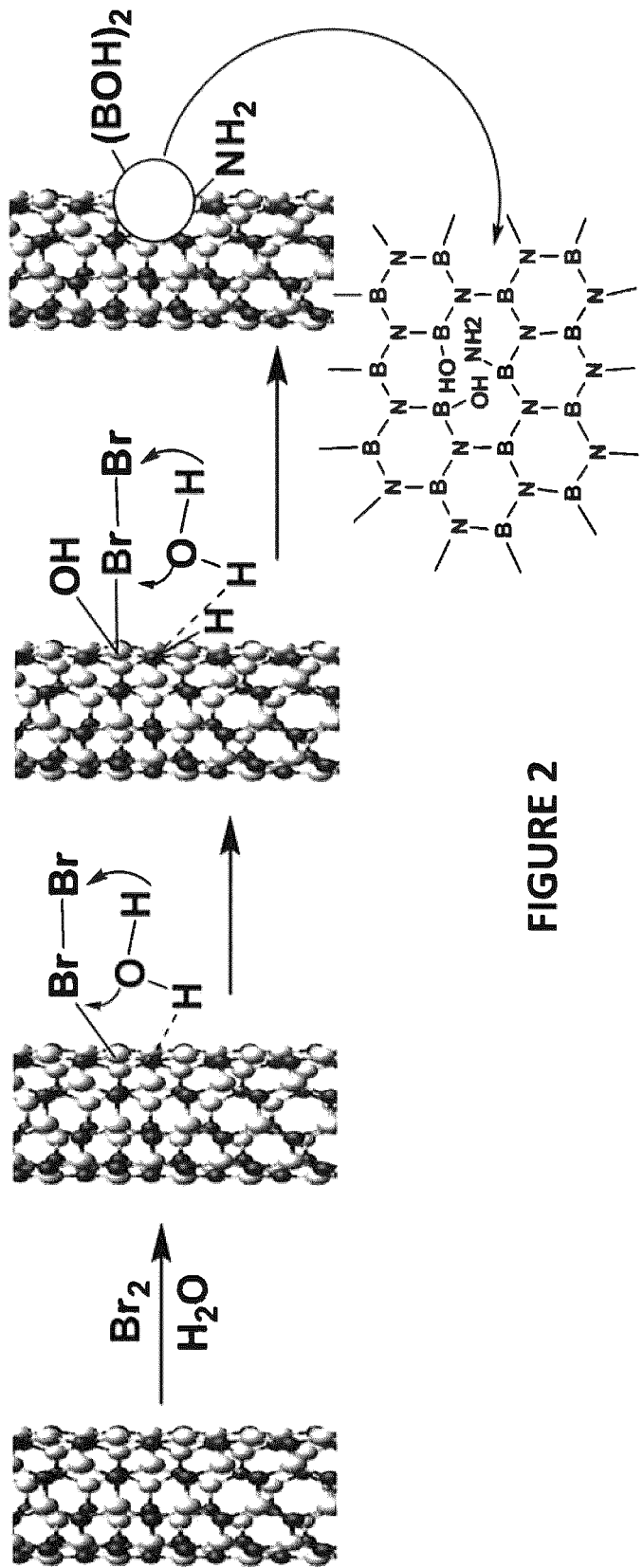
FIG. 2 illustrates a possible mechanism for conversion of BNNTs to modified BNNTs through bromination and spontaneous hydrolyzation.

The level of functionalization of BNNTs depends on the excess amount of bromine added to the aqueous solution, as well as the intensity of sonication treatment, the reaction temperature (typically, from about room temperature to about 50° C.), and the remaining concentration of bromine in the solution. A possible mechanism of the modification of BNNTs using liquid bromine is shown in FIG. 2. The functionalization of BNNTs can be tuned based on the requirement of applications of the modified BNNTs.

The reddish color of the mixture indicated whether the amount of liquid bromine added was sufficient. If the amount of liquid bromine was insufficient, the red color of the mixture quickly disappeared due to the reaction of all of the bromine with the remaining elemental boron particles in the suspension. In this case, more bromine was then added until there was an excess of bromine. For example, the reddish color persisted for two or more days at room temperature, indicating that the reaction of all of the boron impurities was complete. An additional amount of bromine was added with bath-sonication, in order to enhance functionalization of the BNNTs by cleavages of B—N bonds.

Conversion to Modified BNNTs: pH Adjustment

Treatment of the BNNT suspension with excess liquid bromine resulted in highly acidic conditions, such that the modified BNNTs did not dissolve in the clear reddish aqueous solution, which was siphoned out (for example, with a plastic tube) and discarded. What remained was a white precipitate, along with a small amount of reddish aqueous solution.

Fresh distilled water was added to the above residue mixture, and magnetic stirring applied for about 30 minutes. Afterwards, the suspension was allowed to settle, and most of the clear supernatant was siphoned out and discarded.

After a few cycles of removal of a major amount of excess bromine solution, the remaining residue suspension was filtered through a polycarbonate (PC) membrane, and the residue of modified BNNTs was washed with fresh distilled water until the pH of the filtrate was 4 or higher. Subsequently, the wet paste of modified BNNTs was collected in a container with either water or a polar organic solvent. The resulting mixture was then bath-sonicated. After settling, the solution was collected and the precipitate was repeatedly extracted. In one embodiment, a modified BNNTs aqueous solution was determined to have a concentration of 0.3 mg per ml.

Proof of Functionalized BNNTs in Water/Aqueous Solution

The functionalization of BNNTs in the final aqueous solution was demonstrated by adjusting the pH of the aqueous solution. The initial pH of the aqueous solution was around 5.

In one embodiment, a piece of a NaOH pellet was added to a transparent aqueous solution of the modified BNNTs, resulting in the precipitation of the modified BNNTs as the pH rose above 8.

Figure 3:
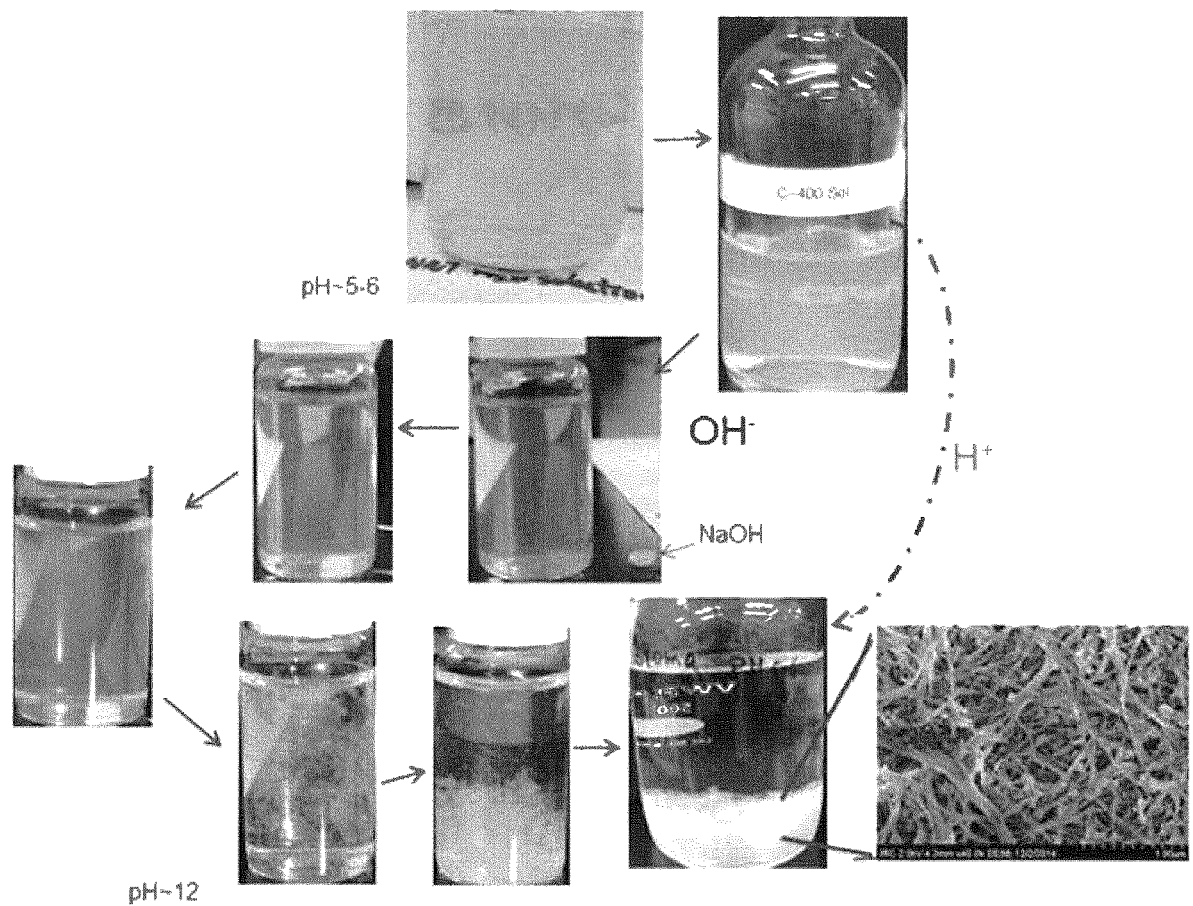
FIG. 3 illustrates a transparent aqueous solution of modified BNNTs and precipitation of modified BNNTs from the aqueous solution by adjusting the pH with either base or acid.

In another embodiment, addition of either hydrochloride or nitric acid to an aqueous solution of the modified BNNTs resulted in rapid precipitation of the modified BNNTs as the pH dropped below 4. FIG. 3 illustrates the precipitation of modified BNNTs from a transparent aqueous solution (of modified BNNTs) by pH adjustment with either acid or base.

Figure 4:
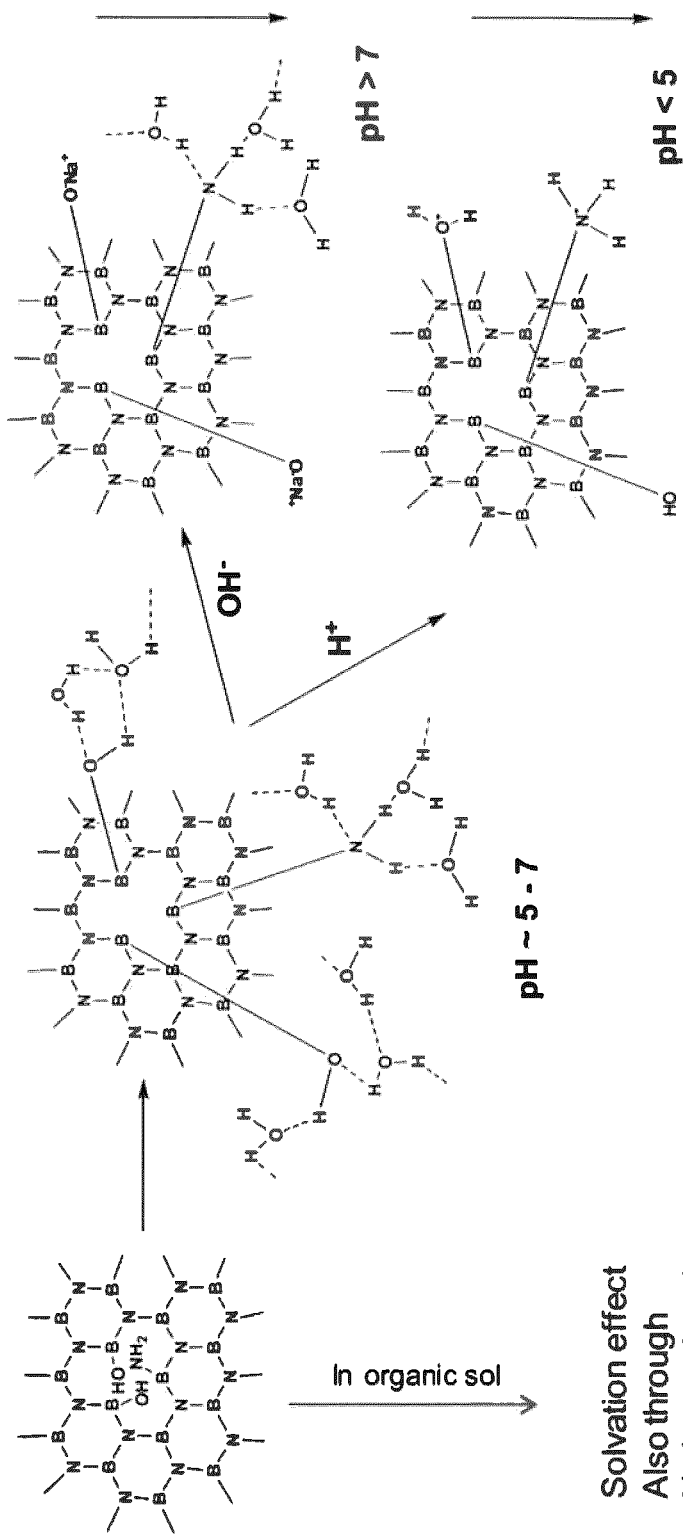
FIG. 4 illustrates possible mechanisms of stabilization of an aqueous solution of modified BNNTs through hydrogen bonding and destabilization of the solution by adjusting the pH with acid or base.

FIG. 4 illustrates possible mechanisms of stabilization of an aqueous solution of modified BNNTs through hydrogen bonding and destabilization of the solution through adjusting of pH by acid or base.

The precipitate in each case was characterized by Scanning Electron Microscopy (SEM), Thermal Gravimetric Analysis (TGA) and X-Ray Photoelectron Spectroscopy (XPS) analyses, which confirmed that the OH/$NH_2$-functionalized BNNTs were dissolved in aqueous solution.

Determination of Functional Groups and Functionalization Level

Figure 5:
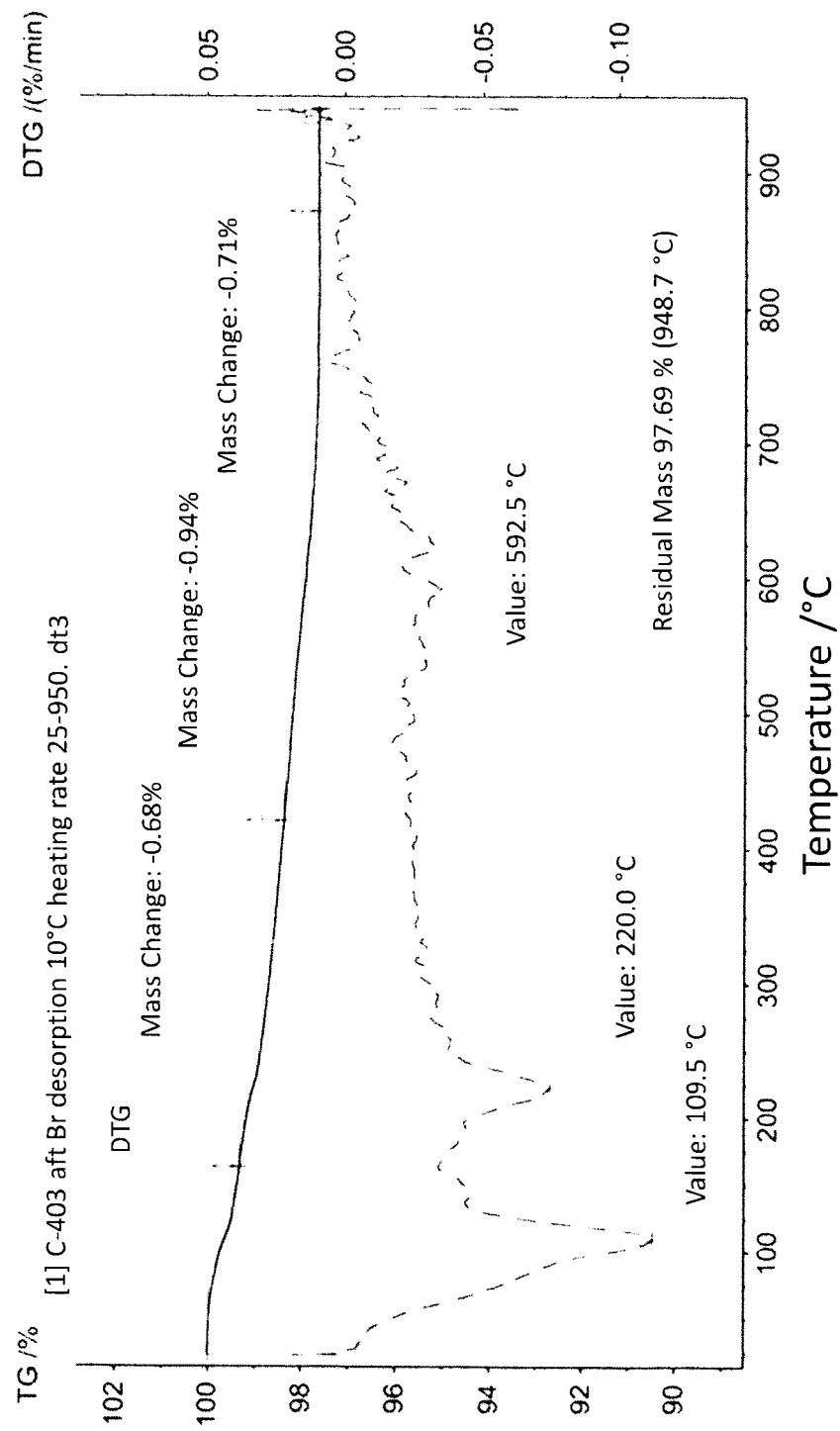
FIG. 5 illustrates a Thermogravimetric Analysis (TGA) of modified BNNTs.
Figure 6:
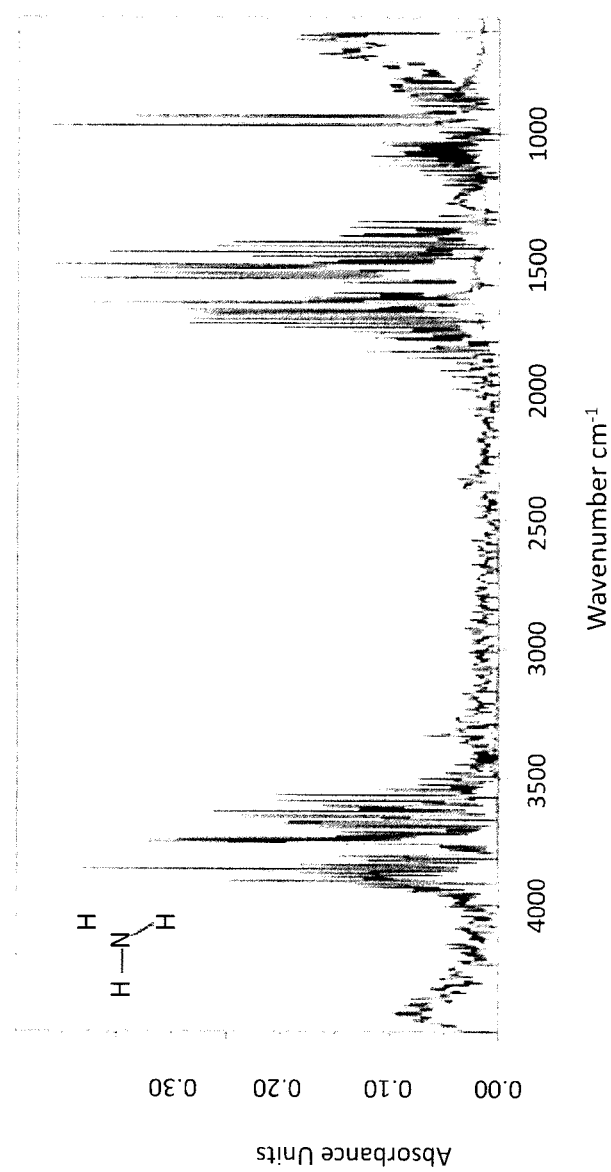
FIG. 6 illustrates an FTIR in-line analysis of surface functional groups at the peak of about 220° C. from the derivative thermogravimetric (DTG) spectrum in FIG. 5.
Figure 7:
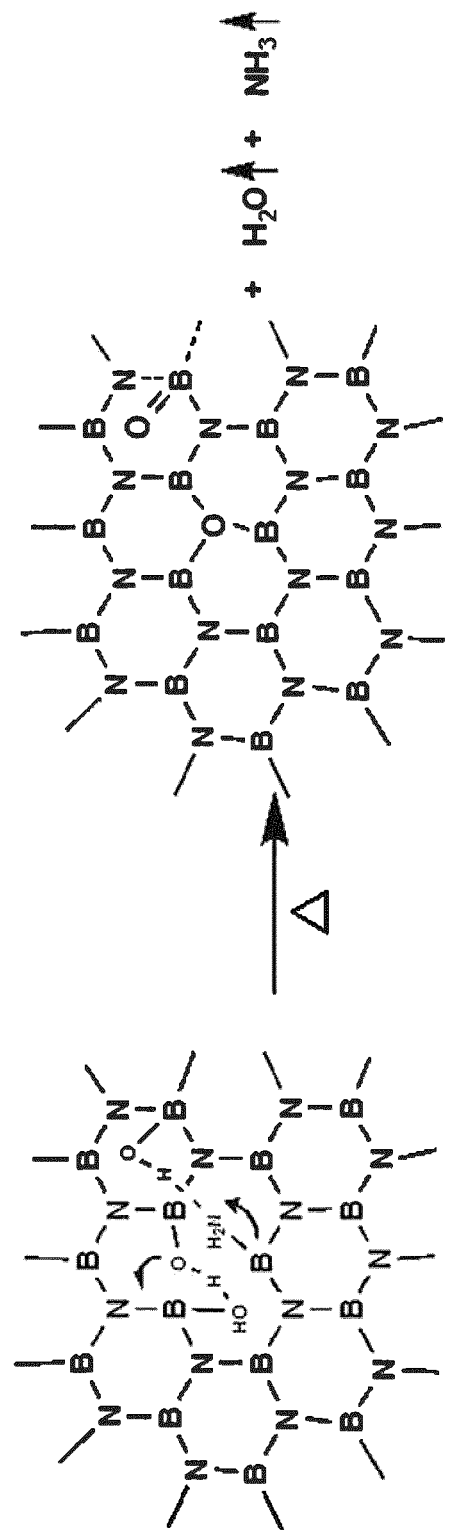
FIG. 7 illustrates a possible mechanism for decomposition of the modified BNNTs through desorption by TGA analysis.

The precipitate, produced as described above by adding either a base or an acid to an aqueous solution of modified BNNTs, was filtered using a PC membrane, carefully washed with water until the pH of the filtrate was between 4 and 8, and then washed with methanol before being dried at about 120° C. for a few days. The sample was characterized by TGA as shown in FIG. 5, in which two major weight losses were seen at about 110° C. and 220° C. The peak at 110° C. was mainly from the adsorption water, but also contained partially-decomposed water and ammonia from the OH/$NH_2$ functional groups. The peak at about 220° C. was mainly from the decomposition of surface functional groups of OH and amine that were confirmed by in-line FTIR analysis (see FIG. 6). From this data, one can roughly estimate about 1 OH per 18 BN-units or 12 six-member B—N rings. FIG. 7 illustrates a possible decomposition mechanism of the modified BNNTs by TGA analysis.

Figure 8:
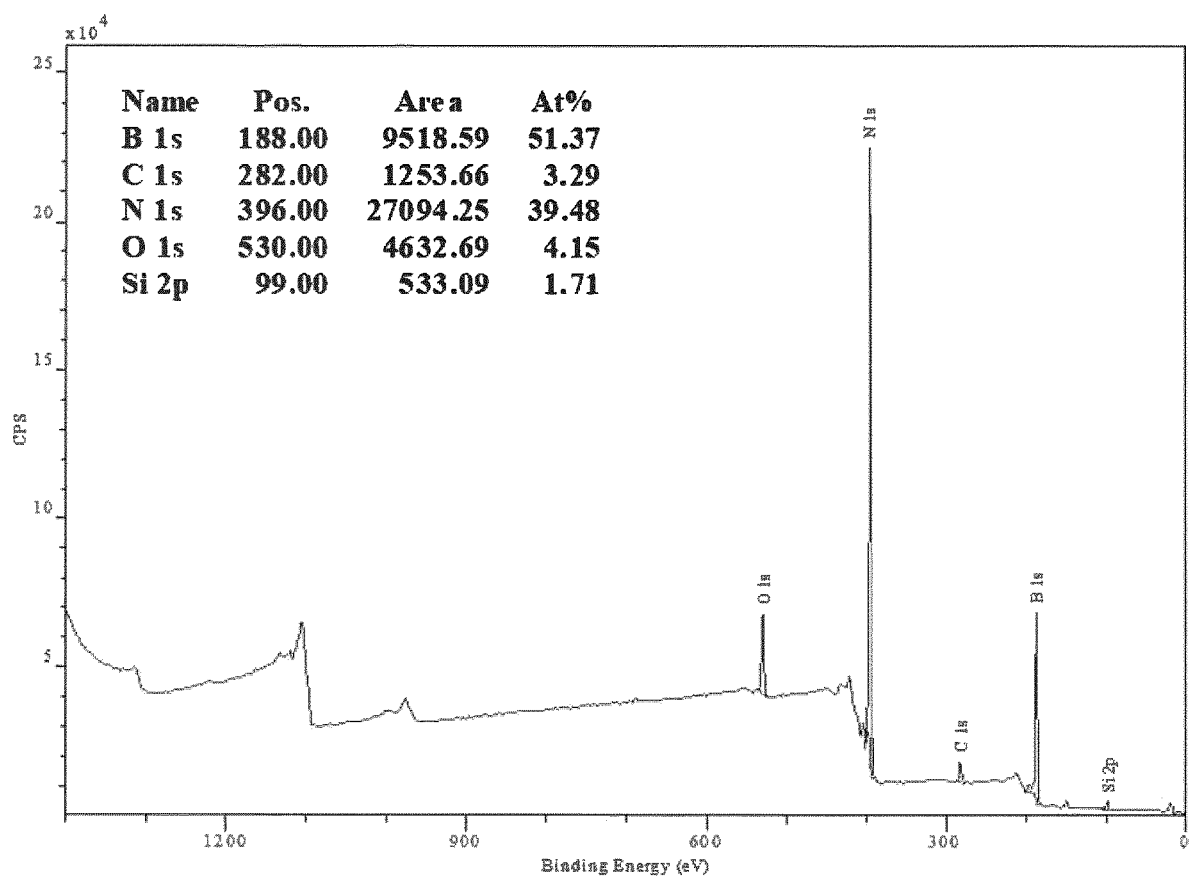
FIG. 8 illustrates XPS analysis of a dry modified BNNT sample.

The sample was also characterized by XPS. For example, FIG. 8 shows an analysis of an isolated dry modified BNNT sample. The spectrum in FIG. 8 is from highly pure (estimated over 95 wt %) and snow-white modified BNNTs. This analysis, based on oxygen, provided an estimate of OH groups that was quite consistent with the results from TGA analysis.

Modified BNNTs in Organic Solution with Organic Polar Solvents

The modified BNNT suspension, prepared after pH adjustment to 4, was filtered through a PC membrane. The resulting wet paste can be extracted with an organic solvent, for example, THF, acetone or DMF, with the assistance of bath-ultrasonication to achieve an organic solution. The solubility of the modified BNNTs differs from one organic solvent to another. For example, among the solvents tested, modified BNNTs exhibited the highest solubility in DMF. In one sample, the concentration of modified BNNTs in DMF was 0.02 mg/ml. In another sample, the concentration was determined to be 0.025 mg/ml, and in a third sample, the concentration was 0.03 mg/ml. The suspension can be also extracted into other polar organic solvents such as acetonitrile, isopropanol and methanol.

Applications of Modified BNNTs and Solutions Thereof

Application: Drop Casting an Aqueous Modified BNNT Solution on a Glass Slide

Figure 9A:
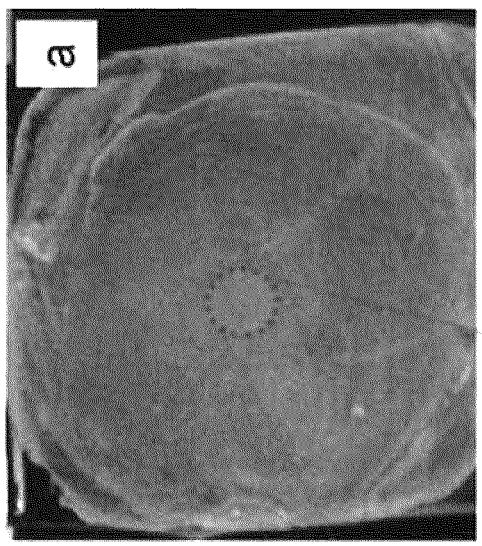
FIG. 9A shows a drop-casting of modified BNNT aqueous solution on a glass slide.

A modified BNNT aqueous solution was drop-cast on a glass slide and dried in an oven at 120° C. The final product is shown in FIG. 9A. The modified BNNT coating adhered firmly to the glass surface without cracking. It was found that the coating could not be removed from the glass slide by bath-sonication in water for 20 minutes. However, the coating was easily removed by immersion and bath sonication in methanol for about one minute.

This offers, for example, an opportunity to produce a uniform coating, with a controlled thickness, by spray coating an aqueous solution of modified BNNTs.

Figure 9C:
FIGS. 9B-9C show verification thereof by Scanning Electron Microscopy (SEM) analysis.
Figure 9B:
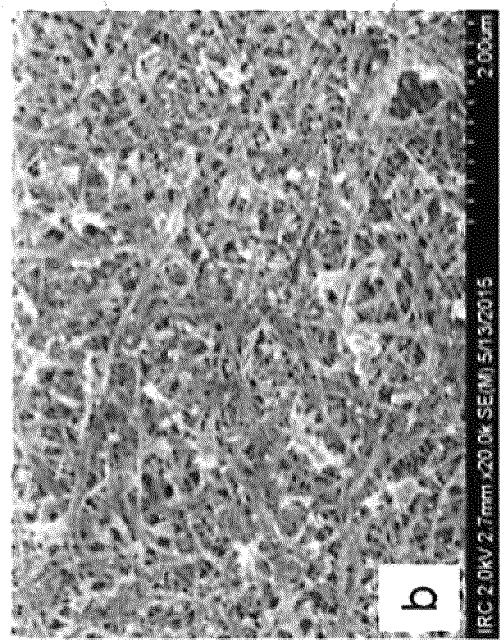

The SEM analysis of the smooth coating area, (as shown in FIGS. 9B and 9C), indicates that the modified BNNTs were randomly oriented within the coating layer. Although the coating was relatively thick, its transparency was still relatively high.

Application: Dip-Coating a Commercial Optical Glass Fiber in an Aqueous Solution of Modified BNNTs Dip-coating of a commercial optical glass fiber was carried out with a system in which a step-motor was used to pull out and push back the glass fiber into an aqueous solution of modified BNNTs. The soaking time, pulling speed and dry-up time in air may influence the quality of coating in term of tightness, density, uniformity, surface smoothness and alignment/orientation of the modified BNNTs within the coating layer.

Commercial optical glass fibers are always coated with a polymer (such as poly acrylate (PA) or polyimide (PI)) for the enhancement of mechanical strength in order to avoid the brittleness of glass in real applications. The optical glass fiber samples used in this experiment had sections where the polyimide coating was removed, thereby revealing a surface of bare optical glass.

In order to examine whether the modified BNNTs were able to coat the bare optical glass surface, the surface morphologies of both the polymer-coated and bare glass surfaces were analyzed with SEM. As a reference, the surface morphology of the optical fiber was imaged in both the PI-coated area and the bare glass surface area before being coated with the modified BNNTs solution (see FIG. 10A).

These optical glass fiber samples were then dip-coated in an aqueous modified BNNTs solution (produced using the method described above) and dried in air. The surface morphology of both the glass surface and the PI-coated surface were examined using SEM. FIG. 10A shows SEM images of a bare optical glass fiber surface before application of the modified BNNTs coating. FIGS. 10B-10D show SEM images of the same surface after application of the modified BNNTs solution coating, from low magnification to high magnification. On both the bare glass surface and the PI surface, similar modified BNNTs coatings were observed. In some areas the modified BNNTs coating was uniform, while in other areas, fewer BNNTs were observed. In addition, in some areas, it was observed that the BNNTs were aligned along the pulling direction.

Application: Modified BNNTs Coatings on Various Substrates

In addition to optical fibers, the following substrates have also been successfully coated with modified BNNTs by either dip-coating or drop-casting using a solution of modified BNNTs: polycarbonate thin film, Polyethylene terephthalate (PET) thin film, polytetrafluoroethylene (PTFE) and polyimide thin film.

Application: Drop-Casting and/or Dip-Coating on Polyethylene Terephthalate (PET) Film A PET film was coated with a BNNTs network by either drop-casting a modified BNNTs aqueous solution or dip-coating into a modified BNNTs aqueous solution. The coating process was carried out both with and without plasma surface cleaning. In both cases, the PET film was well coated with the BNNTs.

Application: Drop-Casting and/or Dip-Coating on Polycarbonate (PC) Film

A PC film was coated with a BNNTs network by either drop-casting a modified BNNTs aqueous solution or dip-coating into a modified BNNTs aqueous solution. The coating application was carried out both with and without plasma surface cleaning, and in both cases the PC film was well coated with BNNTs (as observed by SEM imaging).

Application: Drop-Casting and/or Dip-Coating on Polyimide (Kapton) Film

A Kapton film was coated with a BNNTs network by drop-casting an aqueous BNNTs solution on top of a piece of Kapton-polyimide film, followed by air drying. The Kapton film was well coated with BNNTs (as observed by SEM imaging).

Application: Drop-Casting and/or Dip-Coating on Polytetrafluoroethylene (PTFE) Film A PTFE film was coated with a BNNTs network by drop-casting an aqueous BNNTs solution on top of a PTFE film. The PFTE film was well coated with BNNTs (as observed by SEM imaging).

Application: Integration of Modified BNNTs into Polycarbonate (PC-BNNT Composite)

Figure 11A:
FIGS. 11A-11C are photographs of polycarbonate (PC) and modified BNNT-PC composite thin films at varying concentrations of modified BNNTs: A: 0%; B: 2 wt %; and C: 4 wt %.
Figure 11B:
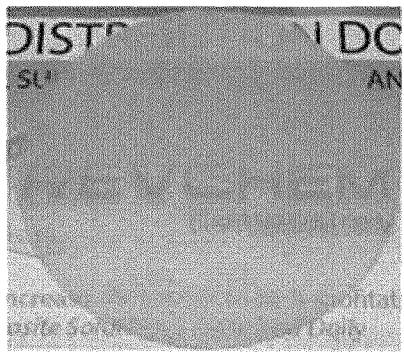
Figure 11C:
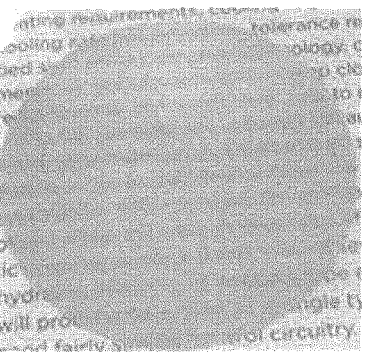

A polycarbonate-BNNTs composite, comprising modified BNNTs integrated into the polycarbonate was made by a solution/suspension process. The resulting composites retained good transparency in a film with about 200 μm thickness, as shown in FIGS. 11A-11C, which are photographs of PC-BNNTs composites at varying concentrations of modified BNNTs. In FIG. 11A, there is 0 wt % modified BNNTs; in FIG. 11B: 2 wt % of modified BNNTs; and FIG. 11C: 4 wt % of modified BNNTs.

Alternatively, the resulting PC-BNNT composite was processed with a twin micro-extruder and then hot-compression molded into standard coupon specimens for mechanical characterization.

The following two tables summarize the results of mechanical tests performed on the PC-BNNT composites using the aforementioned two different techniques for specimen preparations:

TABLE I

Mechanical properties for composites prepared by solution/suspension process

|  | Young's Modulus (MPa) | Tensile stress @ Max load (MPa) | Tensile strain @ Max load (%) | Tensile stress @break (MPa) | Tensile strain @ break (%) |
|---|---|---|---|---|---|
| PC-141R | 1740 ± 170 | 44.6 ± 8.1 | 4.90 ± 0.13 | 42.1 ± 3.9 | 60 ± 41 |
| BNNT-OH 1 wt % | 1960 ± 60 | 50.1 ± 1.5 | 5.12 ± 0.31 | 43.6 ± 2.4 | 15 ± 10 |
| BNNT-OH 4 wt % | 2280 ± 200 | 51.0 ± 1.6 | 4.73 ± 0.23 | 42.4 ± 6.6 | 4 ± 2 |

TABLE II

Mechanical Properties for composites prepared by melt extrusion process

|  | Tensile stress @Max load (MPa) | Tensile strain @ Max load (%) | Young's Modulus (MPa) | Tensile stress @Yield (0.2% offset), (MPa) | Tensile strain @break (%) | Tensile stress @break (MPa) | Energy @break (J) |
|---|---|---|---|---|---|---|---|
| PC-141R | 67.6 (0.6) | 6.4 (0.8) | 2405 (94) | 39.6 (2) | 76.2 (26) | 50.1 (2.6) | 7.12 (2.4) |
| PC/BNNT1% | 68.2 (0.4) | 7.0 (0.2) | 2435 (141) | 39.6 (2.5) | 101 (62) | 55.8 (7) | 9.5 (5.9) |
| % diff. | +0.9 | +9 | +1.2 | 0 | +32 | +11.4 | 33 |
| PC/BNNT2% | 65.6 (0.1) | 5.7 (0.2) | 2730 (207) | 36.3 (1.8) | 10.6 (4.2) | 13.9 (14.1) | 0.73 (0.2) |
| % diff. | −2.9 | −11 | +13.5 | −8 | −86 | −72 | −90 |
| PC/BNNT4% | 61.6 (11) | 4.4 (1.7) | 2705 (51) | 42.3 (1.5) | 11.3 (8) | 49.7 (2.9) | 1.0 (0.8) |
| % diff. | −7.4 | −31 | +12.5 | +6.8 | −85 | −1 | −86 |

Application: Integrating Modified BNNTs into Epoxy Resin (Epoxy-BNNT Composite)

Figure 12:
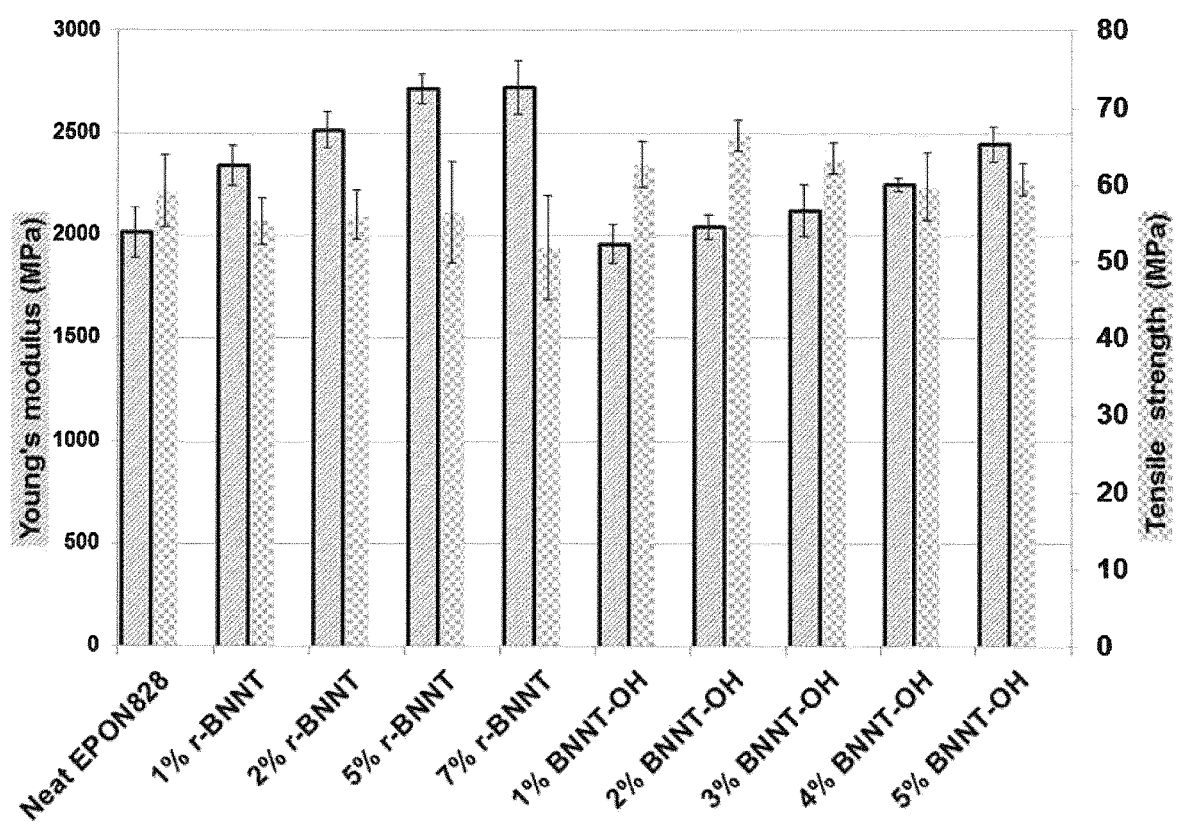
FIG. 12 is a comparison of Young's modulus and tensile strength of raw BNNT (r-BNNT)-Epon828 and modified BNNT (BNNT-OH)-Epon828 composites at different loadings with neat epoxy resin (Epon828).

Modified BNNTs were integrated into an epoxy resin by mixing a modified BNNTs solution/suspension in acetone with Epon828 resin, and then curing with a curing agent after removal of solvents. FIG. 12 is a comparison of Young's modulus and tensile strength for different Epoxy-BNNT composites (neat Epon828, raw BNNT (r-BNNT) and OH-functionalized BNNT (BNNT-OH) Epon828 composites).

It is contemplated that any embodiment discussed in this specification can be implemented with respect to any method, kit, reagent or composition of the modified BNNTs and solutions thereof, and vice versa.

It will be understood that particular embodiments described herein are shown by way of illustration and not as limitations of the modified BNNTs and solutions thereof. The principal features of the modified BNNTs and solutions thereof can be employed in various embodiments without departing from the scope of the modified BNNTs and solutions thereof. Those skilled in the art will recognize or be able to ascertain using no more than routine experimentation, numerous equivalents to the specific procedures described herein. Such equivalents are considered to be within the scope of the modified BNNTs and solutions thereof, and are covered by the claims.

All publications and patent applications mentioned in the specification are indicative of the level of skill of those skilled in the art to which the modified BNNTs and solutions thereof pertains. All publications and patent applications are herein incorporated by reference to the same extent as if each individual publication or patent application was specifically and individually indicated to be incorporated by reference.

Throughout this application, the term "about" is used to indicate that a value includes the inherent variation of error for the device, the method being employed to determine the value or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C or combinations thereof" is intended to include at least one of: A, B, C, AB, AC, BC or ABC, and if order is important in a particular context, also BA, CA, CB, CBA, BCA, ACB, BAC or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the modified BNNTs and solutions thereof. All such similar substitutes and modifications apparent to those skilled in the art are deemed to be within the spirit, scope and concept of the modified BNNTs and solutions thereof, as defined by the appended claims.

REFERENCES

Iijima, Nature (1991), 354, pp. 56.
Iijima et al. Nature (1993), 363, pp. 603 Rubio, A., et al. Physical Review B, (1994), 49(7), pp. 5081.
Chopra, N. G. et al., Science, (1995), 269(5226), pp. 996-997.
Blasé, X, et al. Europhysics Lett (EPL), (1994), 28(5), pp. 335.
Han, W. Q. et al. Appl. Phys. Lett., (2002), 81(6), pp. 1110.
Golberg, D, Bando, Y., Tang, C. C. and Zhi C. Y. Adv. Mater. (2007), 19(18). Pp. 2413.
Kim, K. S., et al. PCT WO2014/169382 A1.
Kim, K. S., et al. ACS Nano, (2014), 8, pp. 6211-6220.
Smith, M. W., et al. Nanotechnology, (2009), 20, 505604.
Fathalizadeh, A. et al., Nano Lett. (2014), 14, pp.
Y. Martinez-Rube et al. J. Phys. Chem. 2015, 119, 26605-26610; a) Golberg et al. ACS Appl. Mater. Interfaces, (2011), 3, pp. 627-632, b) Golberg et al. J Phys. Chem. B, (2006), 110(4), pp. 1525-1528.
Yap et al. J. Phys. Chem. C, 2012, 116, 1798-1804.
Sun et al. Chem Commun 2005, 3670-3672.
Yu et al. Solid states communication, 2009, 149, 763-766, a) Golberg et al. J. Phys. Chem. C (2013), 117, pp. 19568-19576.
Zhi et al., Angew. Chem. 2005, 117, 8146-8149, a) Shin & Guan et al. ACS Nano, (2015), 9(12), pp. 12573-12582.
Golberg, et al., J Phys. Chem. (2007), 111(3), pp. 1230-1233.
Zettl et al. solid state communication (2007), 142, pp. 643-646, a) Zhou et al., Nanotechnology, (2012), 23, pp. 055708.
Zettl et al. J Phys. Chem. C, (2007), 111, pp. 12992-12999.
Zhi, et al. Chemistry—An Asian Journal, (2009), 4, pp. 1536.
Coleman et al. Chem. Eur. J., (2012), 18, pp. 10808-10812.
Gianni et al. J. Colloid Interface Sci., (21012), 374, pp. 308-314.
Ye et al. Chem. Commun, (2013), 49, pp. 388-390, a) Park & Fay et al. Adv. Funct. Mater, (2014), 24, pp. 4497-4506.
Yap et al. Molecules, (2016), 21, pp. 922.
Fay et al. Nanoscale, (2016), 8, pp. 4348-4359.
Golberg et al. Chem. Commun. (2015), pp. 7104-7107.
Kim et al. PCT WO2014/169382 A1.
Kim et al. ACS Nano, (2014), 8(6), pp. 6211-6220.

What is claimed is:

1. A modified boron nitride nanotube (BNNT) comprising pendant hydroxyl (OH) and pendant amino ($NH_2$) functional groups covalently bonded to a surface of the BNNT.

2. The modified BNNT of claim 1, wherein the modified BNNT is single-walled, double-walled, few-walled, or multi-walled.

3. The modified BNNT of claim 1, wherein a ratio of the pendant OH groups to pendant $NH_2$ groups is about 2:1.

4. The modified BNNT of claim 1, wherein the number of pendant OH groups is between about 1 OH per 6 BN-units and about 1 OH per 240 BN-units.

5. An aqueous solution of modified boron nitride nanotubes (BNNTs) comprising modified BNNTs as defined in claim 1, wherein the aqueous solution has a pH of between about 4 and about 8.

6. The aqueous solution of claim 5, wherein the solubility of the modified BNNTs is about 1 mg/mL of solution, or less.

7. An organic solution of modified boron nitride nanotubes (BNNTs) comprising:
a) a polar organic solvent; and
b) modified BNNTs as defined in claim 1.

8. The organic solution of claim 7, wherein the polar organic solvent is an alkyl alcohol, acetonitrile, dimethylformamide (DMF), acetone or tetrahydrofuran (THF).

9. A method for producing an aqueous solution of modified boron nitride nanotubes (BNNTs), the aqueous solution having a pH of from about 4 to about 8, wherein:
the modified BNNTs are as defined in claim 1; and
the method comprises treating BNNTs with a halogen in an aqueous medium.

10. The method of claim 9, further comprising adjusting the pH of the aqueous medium to between about 5 and about 7.

11. A method for producing an organic solution of modified boron nitride nanotubes (BNNTs), wherein:
the modified BNNTs are as defined in claim 1; and
the method comprises:
a) treating BNNTs with a halogen in an aqueous medium to provide an aqueous solution of the modified BNNTs;
b) adjusting a pH of the aqueous solution outside a range of about 4 to about 8 to precipitate at least a portion of the modified BNNTs
c) collecting the precipitate from step (b) comprising modified BNNTs; and
d) adding a polar organic solvent to the modified BNNTs to solubilize at least a portion of the modified BNNTs in the polar organic solvent.

12. A method of coating a surface of a substrate with modified boron nitride nanotubes (BNNTs), wherein the method comprises:
contacting the surface of the substrate with the aqueous solution of claim 5; and
evaporating the solvent of the aqueous solution from the surface of the substrate.

13. The method of claim 12, wherein the substrate is a hydrophilic substrate.

14. The method of claim 12, wherein the substrate is an optical glass fibre, a polyacrylate, a silicon wafer, a glass, a PC film, a PET film or a polyimide film.

15. A method of coating a surface of a substrate with modified boron nitride nanotubes (BNNTs), wherein the method comprises:
contacting the surface of the substrate with the organic solution of claim 7; and
evaporating the polar organic solvent of the organic solution from the surface of the substrate.

16. The method of claim 15, wherein the substrate is a hydrophobic substrate.

17. The method of claim 15, wherein the substrate is an optical glass fibre, a polyacrylate, a glass or a silicon wafer.

18. A nanocomposite comprising:
modified boron nitride nanotubes (BNNTs) as defined in claim 1; and
one or more of a polymer, a ceramic, a metal, an epoxy resin polymer, and an epoxy resin monomer.

19. A method for producing modified boron nitride nanotubes (BNNTs) comprising pendant hydroxyl (OH) and pendant amino ($NH_2$) functional groups covalently bonded to a surface of the BNNTs, the method comprising treating BNNTs with a halogen in an aqueous solution.

20. The method of claim 19, wherein the treatment is carried out at a temperature of between about 20° C. and about 50° C. for a period of about 4 hours to about 48 hours.

21. The method of claim 19, wherein the halogen is chlorine, bromine or iodine.

22. The method of claim 21, wherein the halogen is bromine.

* * * * *